US011057328B2

(12) United States Patent
Liao et al.

(10) Patent No.: US 11,057,328 B2
(45) Date of Patent: Jul. 6, 2021

(54) REAL-TIME RECOMMENDATION OF MESSAGE RECIPIENTS BASED ON RECIPIENT INTEREST LEVEL IN MESSAGE

(71) Applicant: International Business Machines Corporation, Armonk, NY (US)

(72) Inventors: Shen-Jai Liao, Taipei (TW); I-Chien Lin, Taipei (TW); Chih-Hsiung Liu, Taipei (TW); Peter Wu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 15/815,805

(22) Filed: Nov. 17, 2017

(65) Prior Publication Data

US 2019/0158443 A1    May 23, 2019

(51) Int. Cl.
*H04L 12/58* (2006.01)
*H04L 29/08* (2006.01)
*H04L 12/24* (2006.01)
*H04L 12/26* (2006.01)

(52) U.S. Cl.
CPC ......... *H04L 51/14* (2013.01); *H04L 41/0896* (2013.01); *H04L 43/0876* (2013.01); *H04L 43/10* (2013.01); *H04L 51/12* (2013.01); *H04L 51/20* (2013.01); *H04L 51/26* (2013.01); *H04L 67/306* (2013.01); *H04L 41/5019* (2013.01); *H04L 67/02* (2013.01); *H04L 67/12* (2013.01); *H04L 67/18* (2013.01)

(58) Field of Classification Search
CPC ...................................................... H04L 51/14
See application file for complete search history.

(56) References Cited

U.S. PATENT DOCUMENTS

| | | | |
|---|---|---|---|
| 7,711,667 B2 * | 5/2010 | Baumard | H04L 51/12 706/45 |
| 8,380,875 B1 | 2/2013 | Gilmour et al. | |
| 8,788,597 B2 * | 7/2014 | Levow | G06Q 10/107 709/205 |
| 9,355,425 B2 | 5/2016 | Gargi et al. | |
| 2009/0043862 A1 * | 2/2009 | Bordia | H04L 51/12 709/206 |

(Continued)

*Primary Examiner* — Esther B. Henderson
(74) *Attorney, Agent, or Firm* — Schmeiser, Olsen & Watts, LLP; Nicholas L. Cadmus

(57) ABSTRACT

A recipient recommendation system and method may include receiving an input from a message creator using a messaging platform, continuously analyzing the input for a plurality of dynamic characteristics, as the input is received from the message creator via the messaging platform, the plurality of dynamic characteristics being used to determine a content of the input, comparing the content with an interest map that aggregates interests of a plurality of potential recipients from of a plurality of interest matrices, wherein the interests of the plurality of potential recipients are acquired by constantly monitoring a message platform activity of the plurality of potential recipients, determining, as a function of the comparing, a relevance ranking of the plurality of potential recipients with respect to the content input by the message creator, and providing a list of recommended recipients from the plurality of recipients, based on the relevance ranking.

14 Claims, 9 Drawing Sheets

(56) References Cited

U.S. PATENT DOCUMENTS

| | | | |
|---|---|---|---|
| 2009/0082038 A1* | 3/2009 | McKiou | H04W 4/029 |
| | | | 455/456.6 |
| 2010/0290599 A1* | 11/2010 | Weksel | H04M 3/53366 |
| | | | 379/88.08 |
| 2011/0289171 A1* | 11/2011 | Gross | G06F 16/93 |
| | | | 709/206 |
| 2016/0255082 A1 | 9/2016 | Rathod | |
| 2016/0337305 A1 | 11/2016 | Liu et al. | |
| 2016/0371271 A1 | 12/2016 | Bhatia et al. | |

* cited by examiner

REAL-TIME RECOMMENDATION OF MESSAGE RECIPIENTS BASED ON RECIPIENT INTEREST LEVEL IN MESSAGE

TECHNICAL FIELD

The present invention relates to systems and methods for recommending message recipients, and more specifically the embodiments of a recipient recommendation system for real-time recommendation of message recipients based on recipient interests to the content of the message.

BACKGROUND

Creators of messages or articles sometimes desire to only send the message to users who may be interested in the content of the message.

SUMMARY

An embodiment of the present invention relates to a method, and associated computer system and computer program product, for real-time recommendation of message recipients based on recipient interests to the content of the message. A processor of a computing system receives an input from a message creator using a messaging platform. The input is continuously analyzed for a plurality of dynamic characteristics, as the input is received from the message creator via the messaging platform, the plurality of dynamic characteristics being used to determine a content of the input. The content is compared with an interest map that aggregates interests of a plurality of potential recipients from of a plurality of interest matrices, wherein the interests of the plurality of potential recipients are acquired by constantly monitoring a message platform activity of the plurality of potential recipients. As a function of the comparing, a relevance ranking of the plurality of potential recipients is determined with respect to the content input by the message creator. A list of recommended recipients is provided from the plurality of recipients, based on the relevance ranking.

DETAILED DESCRIPTION

For users that prefer to limit recipients of a message or article to recipients that may be interested in the content of the message, the user must manually group recipients/friends together for a specific purpose. For example, the user must manually create a group that the user believes may be interested in the message topic, or must rely on privacy settings that determine who can view the message, such as an article being posted to a social media network. However, the content of the message, article, blog, post, etc. may be quite dynamic, which means that existing friend or recipient lists do not map an appropriate audience. Further, manually selecting a target audience can be rather tedious and time consuming.

Thus, there is a need for a recipient recommendation system for real-time recommendation of message recipients based on recipient interests to the content of the message. In other words, the following method, computer system, and computer program product may allow a user to identify a target audience in real-time, based on a semantic of the input message and potential interest of recipients.

Figure 1:
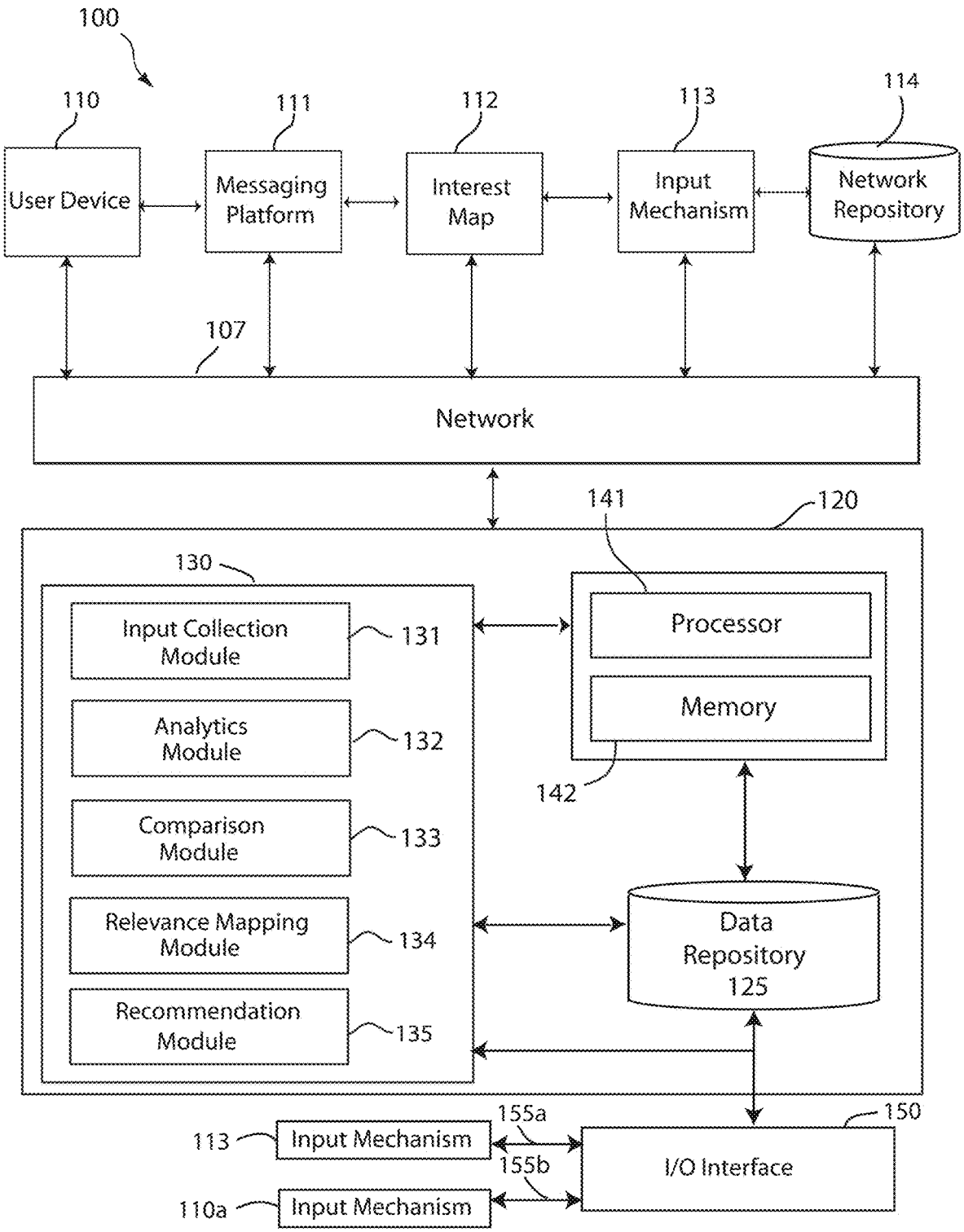
FIG. 1 depicts a block diagram of a recipient recommendation system, in accordance with embodiments of the present invention.

Referring to the drawings, FIG. 1 depicts a block diagram of recipient recommendation system 100, in accordance with embodiments of the present invention. Embodiments of the recipient recommendation system 100 may be a system for recommending a list of recipients of a user's message based on a potential interest level of the recipient of the content of the message. Embodiments of the recipient recommendation system 100 may be useful for users sending, posting, creating and publishing, etc., using one or more messaging platforms or social media platforms, a message, article, blog, post, study, comments, analysis, instructions, offers, advertisements, promotions, and the like. Then user may want to prevent some recipients from receiving the message, and/or may want to increase the probability that a recipient responds, reacts, reproduces, absorbs, understand, etc. the content of the message. Embodiments of a message as used herein may refer to a post on a social media platform, a group message using an instant messaging platform, an email with an attached document containing content, a photograph, a voice message, an article posted to a network or website, and the like. Embodiments of the message may also be a message, a letter, an article, a comment, a thought, an analysis, a communication, and the like.

Embodiments of the recipient recommendation system 100 may be a real-time recipient recommendation system, a message content analysis system, a recipient interest level monitoring and recommendation system, an automatic audience targeting system for sending messages, an audience determination system, and the like. Embodiments of the recipient recommendation system 100 may include a computing system 120. Embodiments of the computing system 120 may be a computer system, a computer, a server, one or more servers, a cloud computing device, a hardware device, a remote server, a user device, a smartphone, and the like.

Furthermore, embodiments of recipient recommendation system 100 may include a user computing device 110, a messaging platform 111, an interest map 112, and input mechanism 113, communicatively coupled to a computing system 120 of the recipient recommendation system 100 over a network 107. For instance, information/data may be transmitted to and received from the user computing device 110, the messaging platform 111, the interest map 112, and the input mechanism 113 over a network 107. A network 107 may be the cloud. Further embodiments of network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA or a mobile communications data network. The architecture of the computer network 107 may be a peer-to-peer network in some embodiments, wherein in other embodiments, the network 107 may be organized as a client/server architecture.

In some embodiments, the network 107 may further comprise, in addition to the computing system 120, a connection to one or more network-accessible knowledge bases 114 containing information of the user, user messaging history, recipient reaction to user messages, user and recipient activity levels, network repositories or other systems connected to the network 107 that may be considered nodes of the network 107. In some embodiments, where the computing system 120 or network repositories allocate resources to be used by the other nodes of the network 107, the computing system 120 and network repository 114 may be referred to as servers.

The network repository 114 may be a data collection area on the network 107 which may back up and save all the data transmitted back and forth between the nodes of the network 107. For example, the network repository may be a data center saving and cataloging information of the user, user messaging history, recipient reaction to user messages, user and recipient activity levels, and the like, to generate both historical and predictive reports regarding a particular user or recipient's activity level based on a particular topic, and the like. In some embodiments, a data collection center housing the network repository 114 may include an analytic module capable of analyzing each piece of data being stored by the network repository 114. Further, the computing system 120 may be integrated with or as a part of the data collection center housing the network repository 114. In some alternative embodiments, the network repository 114 may be a local repository that is connected to the computing system 120.

Embodiments of the user computing device 110 of the recipient recommendation system 100 may be a user device, a cell phone, a smartphone, a user mobile device, a mobile computer, a tablet computer, a PDA, a smartwatch, a dedicated mobile device, a desktop computer, a laptop computer, or other internet accessible device, machine, or hardware. The user device 110 may be used to connect (e.g. over a network) to a messaging platform, such as messaging platform 111, for sending, posting, publishing, etc. one or more messages to one or more recipients. Embodiments of the user device 110 may connect to the computing system 120 over network 107. The user device 110 may be running one or more software applications associated with the messaging platform 111.

In alternative embodiments, the user device 110 may be the computing system 120, wherein the user inputs data (e.g. typing message) using input mechanism 110a of the user device 110. For example, input mechanism 110a may be communicatively coupled to a computing system 120 via an I/O interface 150. For instance, the input mechanism 110a may be connected via an I/O interface 150 to computer system 120. Embodiments of the input mechanism 110a may be integrated, linked, paired, etc. to the user device 110, such as a keyboard, a microphone, a touchscreen, and the like, for inputting text, photographs, videos, etc. to the message platform 111, as well as a sensor, a GPS unit, a peripheral device, a heart monitor sensor, a perspiration sensor, various smartphone sensors and components, accessories, and the like. Although the recommendation system 100 in FIG. 1 depicts a single input mechanism 110a, embodiments of the recipient recommendation system 100 may include more than one input mechanism 110a, that may be integrated with or otherwise paired with the user device 110. The number of input mechanisms 110a connecting to computer system 120 via data bus lines 155b and/or over network 107 may vary from embodiment to embodiment. As shown in FIG. 1, an input mechanism 110a may transmit data by connecting to computing system 120 via the data bus line 155b to an I/O interface 150. An I/O interface 150 may refer to any communication process performed between the computer system 120 and the environment outside of the computer system 120, for example, the input mechanism 110a. Input to the computing system 120 may refer to the signals or instructions sent to the computing system 120, for example, the data collected by the input mechanism 110a, while output may refer to the signals sent out from the computer system 120 to the input mechanism 110a.

Referring still to FIG. 1, embodiments of the messaging platform 111 of the recipient recommendation system 100 may be one or more databases, storage devices, repositories, servers, computers, engines, and the like, that may service, run, etc. a messaging application, such as a social media website, an instant message service, an email program, a text message application, and the like. The messaging platform 111 may be accessed or may share a communication link over network 107, and may be managed and/or controlled by a third party, such as a social media company, computer software company, and the like. In an exemplary embodiment, the messaging platform 111 may be a social media network, social media website, social media engine, and the like, which may support a messaging function allowing users to send messages or post content for one or more recipients, such as social media contacts In other exemplary embodiments, the messaging platform 111 may be a messaging service or network that facilitates messages being sent from a user to another user or a group of users, using one or more computing devices. Aspects of the messaging platform 111 may be downloaded on the user device 110, computing system 120, and recipients' devices. Embodiments of the messaging platform 111 may be coupled to an interest map 112, described in greater detail infra.

Embodiments of the recommendation system 100 may include an input mechanism 113. Embodiments of the input mechanism may be communicatively coupled to a computing system 120 via an I/O interface 150 and/or over network 107. Embodiments of the input mechanism 113 may be computing device, such as a mobile phone, computer, smartwatch, smartphone, wearable device, wearable sensor, tablet computer, laptop computer, desktop computer, an internee connectable device, and the like, of a potential recipient of a message from the user via messaging platform 111. Further embodiments of the input mechanism 113 may sensors, receivers, transmitter, etc. which may be integrated, linked, paired, etc. to a recipient device, such as a keyboard, a microphone, a touchscreen, and the like, for inputting text, photographs, videos, etc. to the message platform 111, as well as a sensor, a GPS unit, a peripheral device, a heart monitor sensor, a perspiration sensor, various smartphone sensors and components, accessories, and the like, for outputting recipient data regarding a recipient status, such as recipient location, recipient stress levels, emotional states, etc. Although the recommendation system 100 in FIG. 1 depicts a single input mechanism 113, embodiments of the recipient recommendation system 100 may include more than one input mechanism 113 (e.g. a plurality of inputs associated with a plurality of potential recipients). The number of input mechanisms 113 connecting to computer system 120 via data bus lines 155*b* and/or over network 107 may vary from embodiment to embodiment. As shown in FIG. 1, an input mechanism 113 may transmit data by connecting to computing system 120 via the data bus line 155*a* to an I/O interface 150, over network 107. Input to the computing system 120 may refer to the signals or instructions sent to the computing system 120, for example, the data collected by the input mechanism 113, while output may refer to the signals sent out from the computer system 120 to the input mechanism 113.

Further, embodiments of the computing system 120 may be equipped with a memory device 142 which may store various data/information/code, and a processor 141 for implementing the tasks associated with the recipient recommendation system 100. In some embodiments, a recipient recommendation application 130 may be loaded in the memory 142 of the computing system 120. The computing system 120 may further include an operating system, which can be a computer program for controlling an operation of the computing system 120, wherein applications loaded onto the computing system 120 may run on top of the operating system to provide various functions. Furthermore, embodiments of computing system 120 may include the recipient recommendation application 130. Embodiments of the recipient recommendation application 130 may be an interface, an application, a program, a module, or a combination of modules. In an exemplary embodiment, the recipient recommendation application 130 may be a software application running on one or more back end servers, servicing multiple computing devices, may be a software application running on a user device 110, wherein the user device 110 handles the processing of the steps, or may be a combination thereof.

Referring still to FIG. 1, embodiments of the recipient recommendation application 130 of the computing system 120 may include a input collection module 131, an analytics module 132, a comparison module 133, a relevance mapping module 134, and a recommendation module 135. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Figure 2:
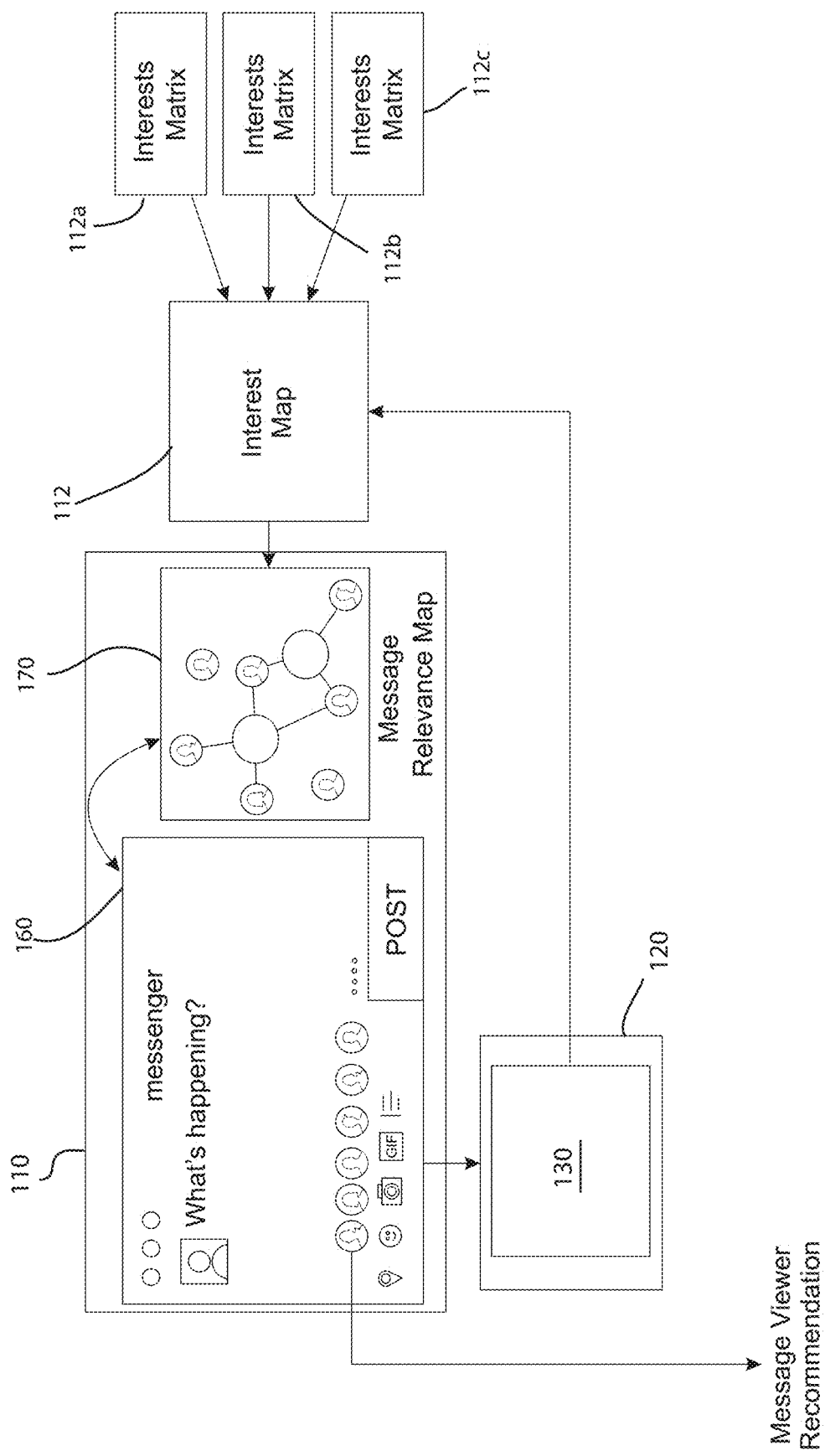
FIG. 2 depicts a schematic view of the recipient recommendation system 100, in accordance with embodiments of the present invention.

Embodiments of the input collection module 131 may include one or more components of hardware and/or software program code for receiving an input from a message creator using a messaging platform, such as platform 111. Embodiments of input may be text, images, words, videos, recordings, numbers, letters, searches, questions, comments, statements, sentences, paragraphs, pages, documents, music, characters, emoji, and the like. The input may be collected or received by the input collection module 131 as the user enters the input via messaging platform 111. For instance, the input collection module 131 may receive input from a user when the user types into a messaging program loaded on a user device 110. The input may be received over network 107 to computing system 120 running the recipient recommendation application 130. Alternatively, the input may be received by the user device 110 running the recipient recommendation application 130. Moreover, embodiments of a message creator may be a user or users that author or otherwise create input for inputting into a messaging platform 111, to be received by at least one recipient. FIG. 2 depicts a schematic view of the recipient recommendation system 100, in accordance with embodiments of the present invention. As part of the recipient recommendation system 100, the user device 110 may include a messenger window 160. A user may use the messenger window 160 to type the input collected by the input collection module 131.

Embodiments of the computing system 120 may further include an analytics module 132. Embodiments of the analytics module 132 may include one or more components of hardware and/or software program code for analyzing or continuously analyzing the input for a plurality of dynamic characteristics, as the input is received from the message creator via the messaging platform 111. For instance, embodiments of the analytics module 132 may constantly analyze, review, process, etc. the input collected by the input collection module 131. The input may be analyzed continuously or in real-time, as the user enters the input into the messenger window 160, as shown in FIG. 2. Each new character of text input by a user may be analyzed as received by the analytics module 132. Embodiments of the analytics module 132 may be analyzing the input for a plurality of dynamic characteristics to ascertain a content of the input. In other words, embodiments of the analytics module 132 may incrementally parse the input from the user (e.g. message creator) to calculate an intention, a sentiment, and entities based on a pre-trained language model. Embodiments of the plurality of dynamic characteristics may be characteristics, factors, clues, conclusions, features, attributes, insights, and the like, of the input collected by the computing system 120. Exemplary embodiments of the plurality of dynamic characteristics may include keywords, trending words over the messaging platform, pronouns, one or more entities, one or more words, an emotional state, an intention, a sentiment, and the like. In an exemplary embodiment, embodiments of the analytics module 132 may continuously analyze the input for the plurality of dynamic characteristics using a natural language classification, an intent analysis, and a sentiment analysis technique to determine one or more key entities of the input, a sentiment of the input, and an intention of the input. If the input is a photograph or video, the analytics module 132 may utilize an image or visual recognition engine to inspect, parse, scan, analyze, etc. a photograph, image, video, or other content to determine one or more descriptions, insights, text, etc. that may be analyzed for dynamic characteristics.

Natural language processing models/techniques may be employed by the analytics module 132 to determine one or more entities, keywords, etc. from the text of input, so that the computing system 120 can understand and/or learn a meaning of the input. For example, embodiments of the analytics module 132 may be able to ascertain certain words from the input, and learn which words or entities may be more significant than the other, or which word may be more the dominant word given the rest of the words of the input.

Natural language processing and sentiment/intention analysis models/techniques may also be employed by the analytics module 132 to determine a sentiment and/or intention of the input. For example, the sentiment analysis performed by the analytics module 132 may help the computing system 120 understand and/or learn a sentiment of the input and/or the message creator from the message creator, in real-time, as the message creator provides the input. A sentiment may refer to whether the input, a feeling of the message creator, an attitude of the message creator, a context of the input, and/or mental state of the message is positive, negative, or neutral. The sentiment may be derived from natural language processing and sentiment analysis techniques, and may be evaluated or scored on a range or sentiment scale. An intention may refer to an act that a message creator may take, based on the input received by the input collection module 131, such as a buying a product, going to a movie, taking a trip, and the like.

Analyzing the input for a plurality of characteristics may be helpful to ascertain a content of the input. For instance, the dynamic characteristics of the input may be used to derive a content of the input, which can be understood, in real-time, by the computing system 120. By understanding the content of the input as the user/message creator is entering text or an image into messenger window 160, the computing system 120 may determine which potential recipients may be interested in the input, for ultimately suggesting or recommending inclusion or exclusion of a potential recipient prior to completing the sending function of the messaging platform 111. Embodiments of the content of the input may be an emotional reaction to a topic, a comment about the topic, a question about the topic, an intention to take action related to the topic, an action taken on the topic, a perspective on the topic, an information request on the topic, a feeling on the topic, an advertisement related to the topic, a marketing strategy on the topic, a poll related to the topic, a feedback request about the topic, an offer related to the topic, a promotion of the topic, a combination thereof, and the like. Embodiments of a topic may be related to a good, a subject, a geographic location, a service, a service provider, a retailer, an object, a team, a sport, an individual, a county, a political figure, a political issue, an item for sale, a movie, a television show, a computer technology, or any other topic discussed on a messaging platform 111.

Referring still to FIGS. 1 and 2, embodiments of the computing system 120 may include a comparison module 133. Embodiments of the comparison module 133 may include one or more components of hardware and/or software program code for comparing the content of the input with an interest map 112 that aggregates interests of a plurality of potential recipients from of a plurality of interest matrices 112a, 112b, 112c. For example, embodiments of the comparison module 133 may perform a comparison of the content with the interest map 112 to identify potential recipients based on interests of the potential recipient. Interest determination may be based on one or more of a potential recipient's interest level in the content, knowledge level of the content, understanding level of the content, commenting activity level of the content, and the like. The interests of the plurality of potential recipients may be acquired by monitoring or constantly monitoring a message platform activity and/or activity level and/or interest level of the plurality of potential recipients. For instance, embodiments of the comparison module 133 may analyze a platform activity, such as posting to a social media network, such as messaging platform 111, leaving comments, uploading images, sharing videos, of a potential recipient on the messaging platform 111, including one or more social media networks. Embodiments of the comparison module 133 may also analyze a shared content of the potential recipient. The shared content shared, uploaded, or otherwise posted on the platform 111 may be photographs, videos, comments made on other contacts' pages, text-based posts made to the potential recipient's own social media page, profile, and the like. The shared content may be analyzed, parsed, scanned, searched, inspected, etc. for understanding and determining an interest level in a particular topic or subject. In an exemplary embodiment, the comparison module 133 may utilize a natural language technique to determine one or more keywords, an image or visual recognition engine to inspect, parse, scan, analyze, etc. a photograph, image, video, or other content to determine one or more descriptions or insights that describe or are associated with the photograph, image, video, or other content, or a combination of natural language techniques, cognitive applications/engines, and visual recognition engines to determine an interest level of a potential recipient for a given topic, based on the shared content available on one or more social media platforms/messaging platforms. Accordingly, the shared content may be analyzed by the comparison module 133 to ascertain a context, understanding, level of knowledge, an interest level, and the like, on various topics. A number of posts, a time between posts, a number of times the potential recipient logs into the messaging platform, etc. may be used to ascertain an activity level of the potential recipient. The potential recipient data (e.g. activity level, interest level, knowledge level, frequency of posts, etc.) associated with the activity level and the interest level may be combined and used as a further analytic metric for determining an overall interest of the potential recipient and relevance of the potential recipient to the content created by the message creator.

The potential recipient data may be stored in a plurality of interest matrices 112a, 112b, 112c. Each matrix 112a, 112b, 112c may be associated with a single potential recipient. Embodiments of the potential recipient may be an individual connected to the user via the same messaging platform 111, a social contact or electronic friend, a potential email recipient, an individual accessing a blog/website/archive, or any individual or computer capable of receiving messages via a messaging platform 111. The matrices 112a, 112b, 112c may be a database, a map, a node, a storage medium, a data repository, and the like, which may receive and store the potential recipient data obtained by comparison module 133 of the computing system 120. In an exemplary embodiment, the plurality of interest matrices 112a, 112b, 112c may be accessible or otherwise coupled to the interest map 112. The interest map 112 may be referred to as potential recipient interest map 112. Embodiments of the interest map 112 may be an engine, database, server, combinations thereof, and the like, which may act to aggregate or otherwise mesh the data from the plurality of interest matrices 112a, 112b, 112c, so that the computing system 120 may have access to multiple potential recipient's data in a single location. Embodiments of the interest map 112 may aggregate topic interests of a group of friends associated with the user, a network of subscribers, a large pool of potential recipients, potential friends, the general public having an account with the messaging platform 111, which may be used by the comparison module 133 to compare an interest level of a plurality of potential recipients with the content created by the message creator. Embodiments of the interest map 112 of the recipient recommendation system 100 may be used to filter, organize, map, analyze, etc. the potential recipient data so that locating interest level information may be more organized for the comparison module 133 of the computing system 120. In an alternative embodiment, the comparison module 133 may be coupled to or may access each matrix 112a, 112b, 112c directly, without the use of the interest map 112. Further, embodiments of the interest map 112 may be embedded onto a messenger platform 111, a messenger application software on the user device 110, or in a cloud environment, over network 107.

Referring again to FIG. 1, embodiments of the computing system 120 may include a relevance mapping module 134. Embodiments of the relevance mapping module 134 may include one or more components of hardware and/or software program code for determining as a function of the comparing, a relevance ranking of the plurality of potential recipients with respect to the content input by the message creator. For instance, embodiments of the relevance mapping module 134 may utilize the comparison of the content and the interest map, which may provide and/or generate a preliminary list of potential recipients that may potentially have some interest in the content, and determine a strength of interest (e.g. a weighted calculation from 0.0-1.0) to map and/or rank a relevance of the potential recipients with the content created by the message creator. Based on the results of the relevance rankings, the computing system 120 may provide recommended recipients for the user to select as recipients for the message.

Figure 3:
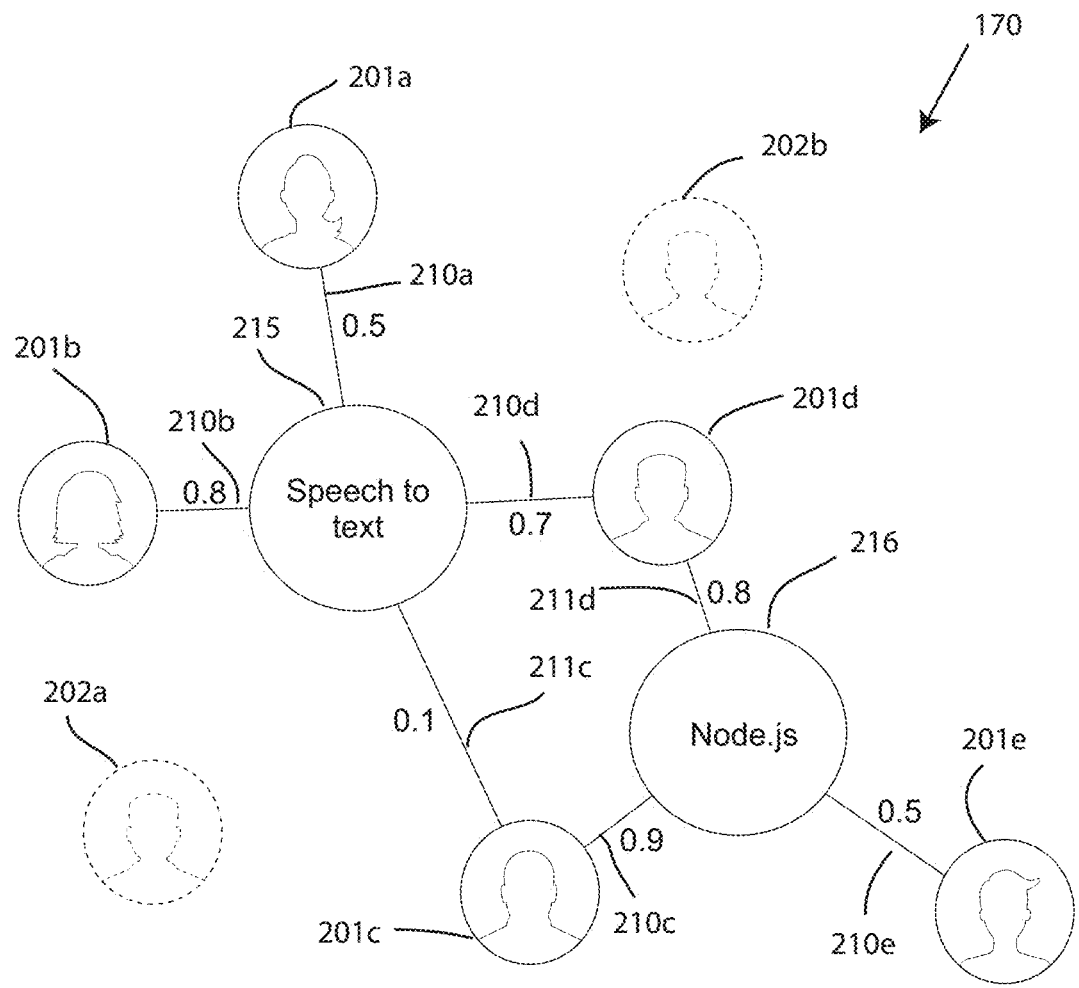
FIG. 3 depicts a visual relevance graphic, in accordance with embodiments of the present invention.

Embodiments of the relevance mapping module 134 may generate and display a visual graphic 170 representing the relevance ranking of the plurality of potential recipients. In some embodiments, the visual graphic 170 may be displayed proximate a message window 160 of the message platform 111, as shown in FIG. 2. A more detailed visual graphic is depicted in FIG. 3, which depicts a visual relevance graphic 170, in accordance with embodiments of the present invention. Embodiments of the visual graphic 170 may be a weighted edge map, wherein an edge of the weighted edge map corresponding to a potential recipient is proportionate to the relevance ranking calculated for the potential recipient ranking. Turning to the visual graphic 170 in FIG. 3, embodiments of the relevance mapping module 134 may analyze the potential recipient data in view of the comparison by the comparison module 134 and determine a relevance or strength metric for how relevant or how likely a potential recipient is to understand, enjoy, be interested in, react to, etc. the content of the message of the user/message creator.

Embodiments of the visual relevance graphic 170 may display as a node of the graphic or map, an entity or keyword 215, 216 detected in the input by the message. In the example map 170 created, rendered, generated by the relevance mapping module 134 and shown in FIG. 3, the entities 215, 216 are "speech to text" and "Node.js," based on a collected input of "The new WATSON speech to text service update looks promising, and it very easy to get started with its Node.js SDK." Potential recipient 201a has been determined to be a potential recipient relevant to the content of the input, in particular "speech to text". The relevance mapping module 134 has further calculated a weight of 0.5 of 1.0, depicted by edge 210a, with respect to "speech to text." Potential recipient 201b has been determined to be a potential recipient relevant to the content of the input, in particular "speech to text." The relevance mapping module 134 has further calculated a weight of 0.8 of 1.0, depicted by edge 210b, with respect to "speech to text." From this graphic 170, the user may visually observe that potential recipient 201b may be more relevant to the user's content of "speech to text" than potential recipient 201a, however, both potential recipient 201a and 201b are determined to likely have an interest in "speech to text." Potential recipient 201c has been determined to be a potential recipient relevant to the content of the input, in particular both "speech to text" and "Node.js." The relevance mapping module 134 has further calculated a weight of 0.1 of 1.0, depicted by edge 210c, with respect to "speech to text," but a higher relevance of 0.9 with respect to "Node.js" as depicted by edge 211c. From this graphic 170, the user may visually observe that potential recipient 201c may be less relevant to "speech to text" than potential recipients 201a and 201b, but may also have an interest in "Node.js." However, potential recipients 201a, 201b, and 201c are determined to likely have an interest in the content as a whole. Potential recipient 201d has been determined to be a potential recipient relevant to the content of the input, in particular both "speech to text" and "Node.js.". The relevance mapping module 134 has further calculated a weight of 0.7 of 1.0 with respect to "speech to text", as depicted by edge 210d, but has a higher relevance of 0.8 in "Node.js", as depicted by edge 211d. From this graphic 170, the user may visually observe that potential recipient 201d may be less relevant to "speech to text" than potential recipient 201b, but may also have an interest in "Node.js." However, potential recipients 201a, 201b, 201c, and 201d are determined to likely have an interest in the content as a whole. Potential recipient 201e has been determined to be a potential recipient relevant to the content of the input. The relevance mapping module 134 has further calculated a weight of 0.5 of 1.0, depicted by edge 210e. From this graphic 170, the user may visually observe that potential recipient 201e may be less relevant to the user's content of "Node.js" than potential recipients 201c and 201d, but does not likely have an interest level "speech to text"; however, potential recipients 201a, 201b, 201c, 201d, and 201e have all been determined to likely have an interest in the content. The graphic 170 proximate the messenger window 160 may highlight the icons for the relevant potential recipients 201a-201e.

Conversely, potential recipients 202a, 202b have been determined not to be relevant to the content of the input, and would likely not have an interest in receiving the content, and/or the message creator might wish to intentionally exclude the potential recipients 202a, 202b. The lack of relevance or interest in the content may be visually displayed to the user by not including an edge connecting the potential recipient icon for potential recipient 202a, as well as greying out the icon for potential recipient 202a. FIG. 3 depicts a lack of interest/relevance to the content by showing the icons for potential recipients 202a, 202b in broken lines.

Accordingly, embodiments of the relevance mapping module 134 may utilize the potential recipient data collected, analyzed, and compared with the content of the user's input to visually depict a relevance of potential recipients from a same pool, such as other individuals using a particular messaging platform 111.

Referring back to FIG. 1, embodiments of the computing system 120 may include a recommendation module 135. Embodiments of the recommendation module 135 may include one or more components of hardware and/or software program code for providing a list of recommended recipients from the plurality of recipients, based on the relevance ranking. For instance, embodiments of the recommendation module 135 may scan, interpret, analyze, etc. the visual graphic map 170, or the data associated therewith, to generate a list of recommended recipients for the user, as the user is typing the input into the messenger window 160, based on the continuous analysis of the analytics module 132, and the resulting comparison and mapping steps performed by the comparison module 133 and the relevance mapping module 134. In other words, as the message creator is typing or otherwise providing input, a list of existing contacts, recipients, friends, etc. may appear in the messenger window 160 or proximate thereto, the list representing recommended recipients based on the recipient recommendation application 130. The message creator may select recipients from the list of recommended recipients so that a target audience receives a message from the message creator, and not irrelevant recipients. Alternatively, the recommendation module 135 may automatically populate a recipient list within the messenger window 160, based on a predetermined setting, such as all interested and relevant recipients, only recipients with a score higher than a certain threshold, and the like.

Figure 4:
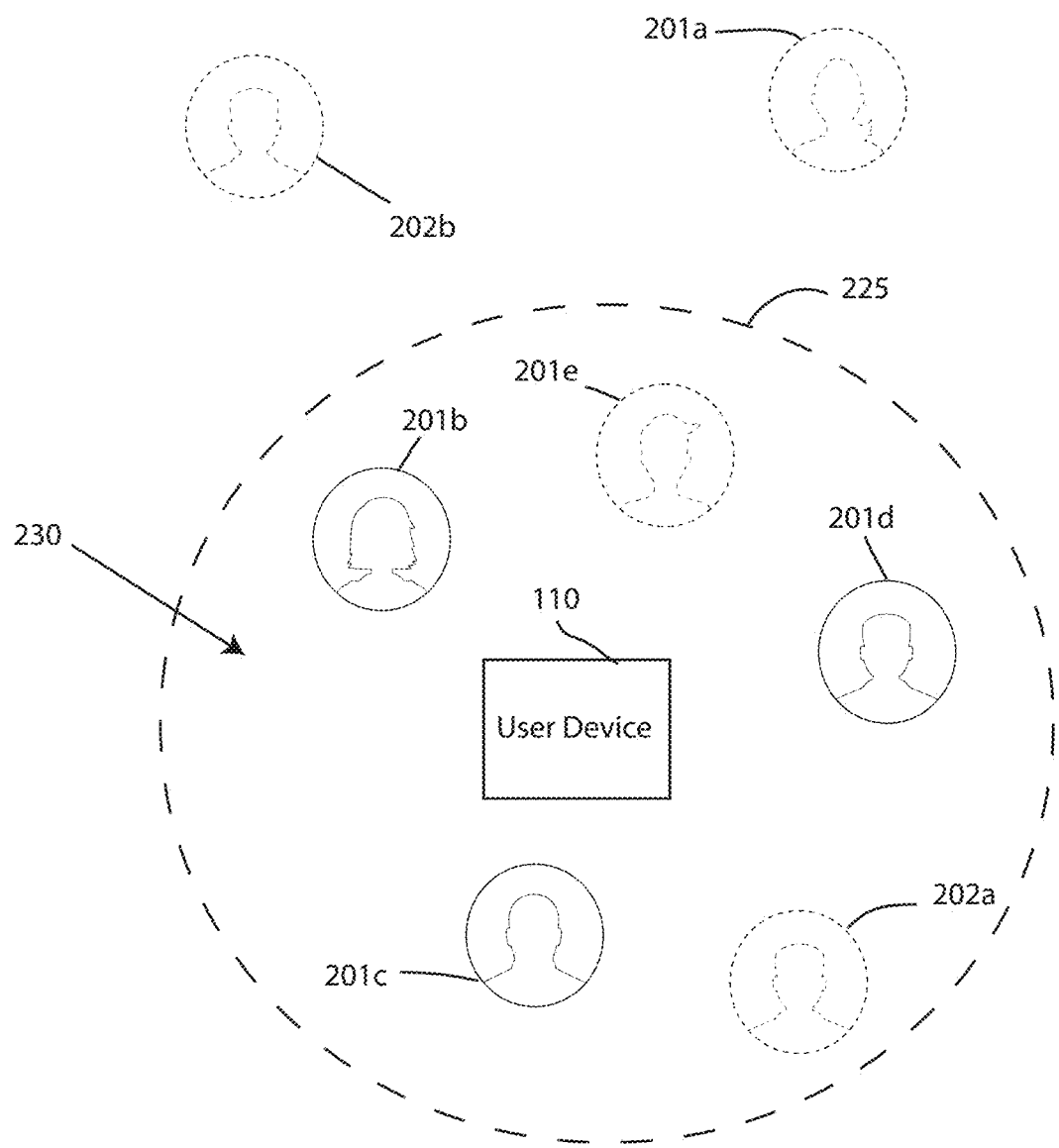
FIG. 4 depicts scenario where a recommended recipient list is modified, in accordance with embodiments of the present invention.

Embodiments of the recommendation module 135 may also adjust, modify, alter, etc. the list of recommended recipients based on additional factors. For example, one or more filters may be applied, depending on a type of message being sent. If the type of a message is a time-sensitive promotion for discounted speech to text software at retail store, then the recommended recipients, while may be larger if going solely on relevance and interest levels, may be further filtered or limited based on a geographic proximity to the user device 110, or a threshold distance from the potential recipient to the user device 110, or vice versa. FIG. 4 depicts scenario where a recommended recipient list is modified, in accordance with embodiments of the present invention. For example, the recommended list of recipients based solely on relevance and interest level as shown in FIG. 3 would include potential recipient 201a, 201b, 201c, 201d, and 201e. In FIG. 4, a proximity threshold 225 to the user device 135 is additionally added as a requirement to be considered a recommended recipient. Based on this additional requirement, potential recipient 201a may no longer be present on the list of recommended recipients because potential recipient 201a is outside a proximity threshold to the user device 110, and does not share a same environment 230 of the user/message creator. In the example of a time-sensitive promotion for speech to text software, although potential recipient is relevant and has an interest level in speech to text, the potential recipient 201a is too far away to arrive in time for the time-sensitive promotion, so the recommendation module 135 may now exclude potential recipient 201a. Conversely, the additional threshold requirement may expand a list of recommended recipients. For example, although potential recipient 202a is determined to not have an interest level or have relevance to "speech to text," the potential recipient 202a may nonetheless want to take advantage of a great deal, and thus the recommendation module 135 may not recommend potential recipient 202a to the user/message creator.

Embodiments of the recommendation module 135 may also modify, adjust, change, alter, etc., the recommended recipient list based on an additional factors such as physical condition of the potential recipient, whether a potential recipient is sleeping, an emotional state of mind of the potential recipient, whether the user is available, whether the potential recipient is stressed, etc. One or more input mechanism 113 coupled to the computing system 120 may communicate, transmit, or otherwise send potential recipient data to the computer system 120 for analyzing whether to modify or adjust the recommended recipient list. Embodiments of the computing system 120 may receive the recipient data from one or more input mechanisms 113 which may be positioned within an environment shared by the recipient, worn by the recipient, or otherwise disposed in a location that can result in obtaining recipient data input mechanisms 113 may be a sensor, an input device, or any input mechanism. For example, input mechanism 113 may be a biometric sensor, a wearable sensor, an environmental sensor, a camera, a camcorder, a microphone, a peripheral device, a computing device, a mobile computing device, such as a smartphone or tablet, facial recognition sensor, voice capture device, and the like. Embodiments of input mechanism 113 may also include a heart rate monitor used to track a current or historical average heart rate of the potential recipient; wireless-enabled wearble technology, such as an activity tracker or smartwatch that tracks a heart rate, an activity level (e.g. number of calories burned, total steps in a day, etc.), a quality of sleep, a diet, a number of calories burned; a robotic therapeutic sensor; a blood pressure monitor; a perspiration sensor; and other wearable sensor hardware. Embodiments of input mechanism 113 may further include environmental sensors either worn or placed in a potential recipient environment, such as an office or study, that can measure air quality, temperature, pressure, $NO_2$ levels, humidity, and the like, which may be helpful in suggesting a location of a meeting or to gauge a comfort level of a potential recipient. Further embodiments of input mechanisms 113 not specifically listed herein may be utilized to collect data about the recipient or recipient conditions.

Further embodiments of input mechanism 113 may include a mobile computing device, such as a smartphone or tablet device, which may run various applications that contain data about the potential recipient. For example, a potential recipient's smartphone may include a sleep tracking application that may send sleep data to the computing system 120, or may send relevant social media information to the computing system 120. The mobile computing device as used as sensor may also utilize the device's camera, microphone, and other embedded sensors to send information to the computing system 120. Moreover, embodiments of sensors 110 may encompass other input mechanisms, such as a user computer that may send information to the computing system 120, wherein the user computer may be loaded with software programs that are designed to track a productivity or work output leve.

Furthermore, embodiments of the one or more input mechanisms 113 may be in communication with each other. The input mechanisms 113 may interact with each other for collecting comprehensive, accurate, timely, and organized data, and sending to computing system 120. A first sensor may request help from another sensor to confirm a condition of the potential recipient or a data result from the first sensor. For example, a sleep tracking application may determine that a potential is sleeping, and a GPS function may indicate the potential recipient is indeed located at home. Additionally, data received by the computing system 120 that is collected by a first sensor may be dependent on another sensor. Further, embodiments of the put mechanisms 113 may be synchronized with each other to provide accurate and timely data in combination to the computing system 120. Any sensor may communicate with the other sensors. The interactive communication between the sensors 110 may modify, update, augment, bolster, confirm, reference, etc. data received and/or collected by the sensor, as well as improve the accuracy and efficiency of the data. The data received from the input mechanisms 113 may help determine physical condition of the potential recipient, whether a potential recipient is sleeping, an emotional state of mind of the potential recipient, whether the user is available, whether the potential recipient is stressed, etc., which may be used as another filter for the recommendation module 135.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention). Moreover, embodiments of the recipient recommendation system 100 may improve messaging applications and computer technology by offering a method to conserve computer resources by reducing a number of irrelevant recipients to a message from a message creator, utilizing hardware to intelligently connect users over the network and evaluate relevance and interest levels on a given subject. Embodiments of the recipient recommendation system 100 may further filter the recommended recipients based on data pertaining to the individual collected by one or more sensors. Thus, the recipient recommendation system 100 may be individualized to each user/user device.

Figure 5:
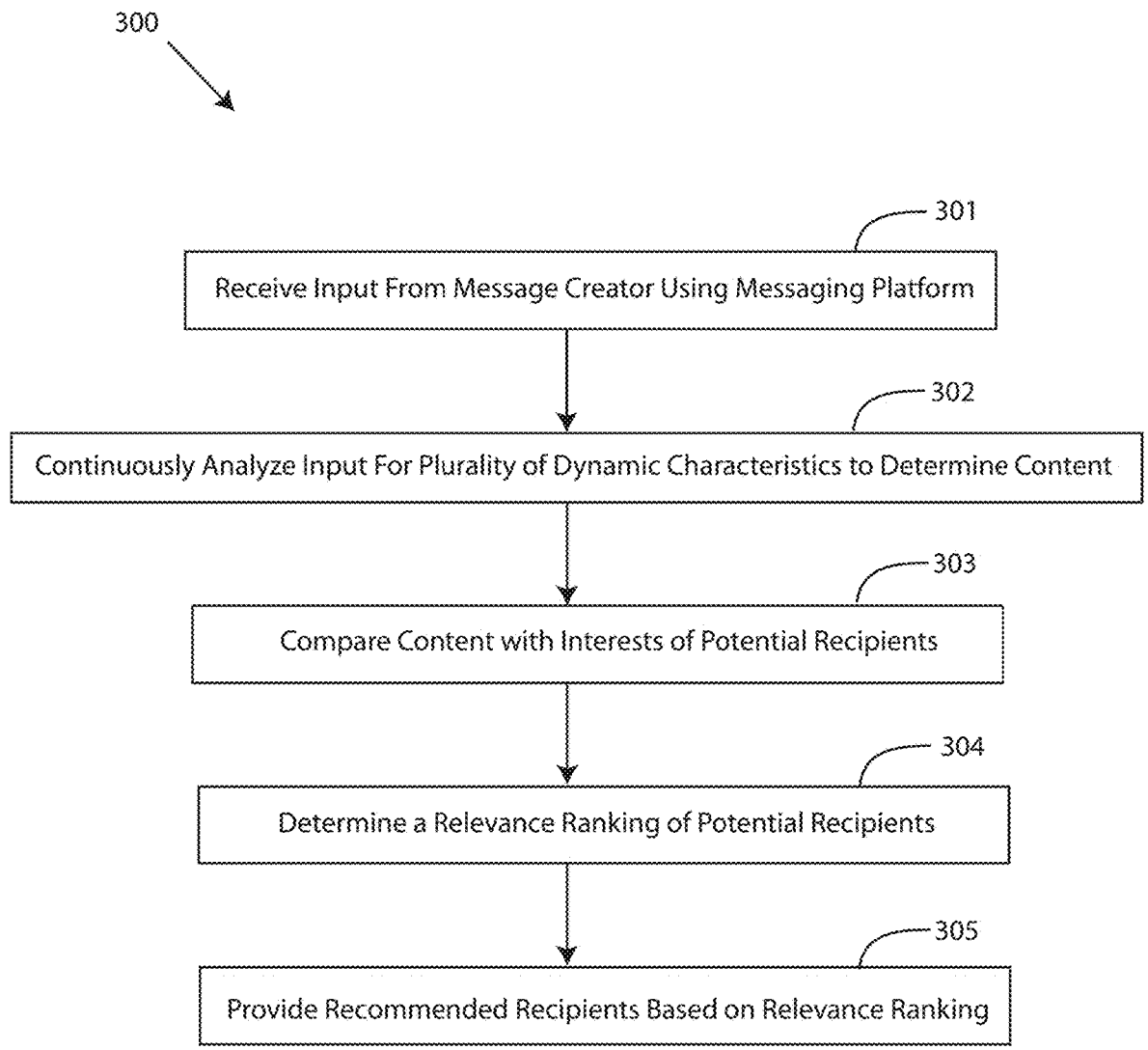
FIG. 5 depicts a flow chart of a method for real-time recommendation of message recipients based on recipient interests to the content of the message, in accordance with embodiments of the present invention.

Referring now to FIG. 5, which depicts a flow chart of a method 300 for real-time recommendation of message recipients based on recipient interests to the content of the message, in accordance with embodiments of the present invention. One embodiment of a method 300 or algorithm that may be implemented for real-time recommendation of message recipients based on recipient interests to the content of the message with the recipient recommendation system 100 described in FIGS. 1-4 using one or more computer systems as defined generically in FIG. 7 below, and more specifically by the specific embodiments of FIG. 1.

Embodiments of the method 300 for real-time recommendation of message recipients based on recipient interests to the content of the message, in accordance with embodiments of the present invention, may begin at step 301 wherein input is received from a message creator (e.g. typing a social media post), using a messaging platform 111. Step 302 continuously analyzes the input for dynamic characteristics, such as entities, sentiment, intention, and the like. The dynamic characteristics may be used for determining a content of the input, understood by the computing system 120. Step 303 compares the content with interests of potential interest. Step 304 determines a relevance ranking of the potential interests. Step 305 provides a recommended recipients list based on the relevance ranking determined in step 304.

Figure 6:
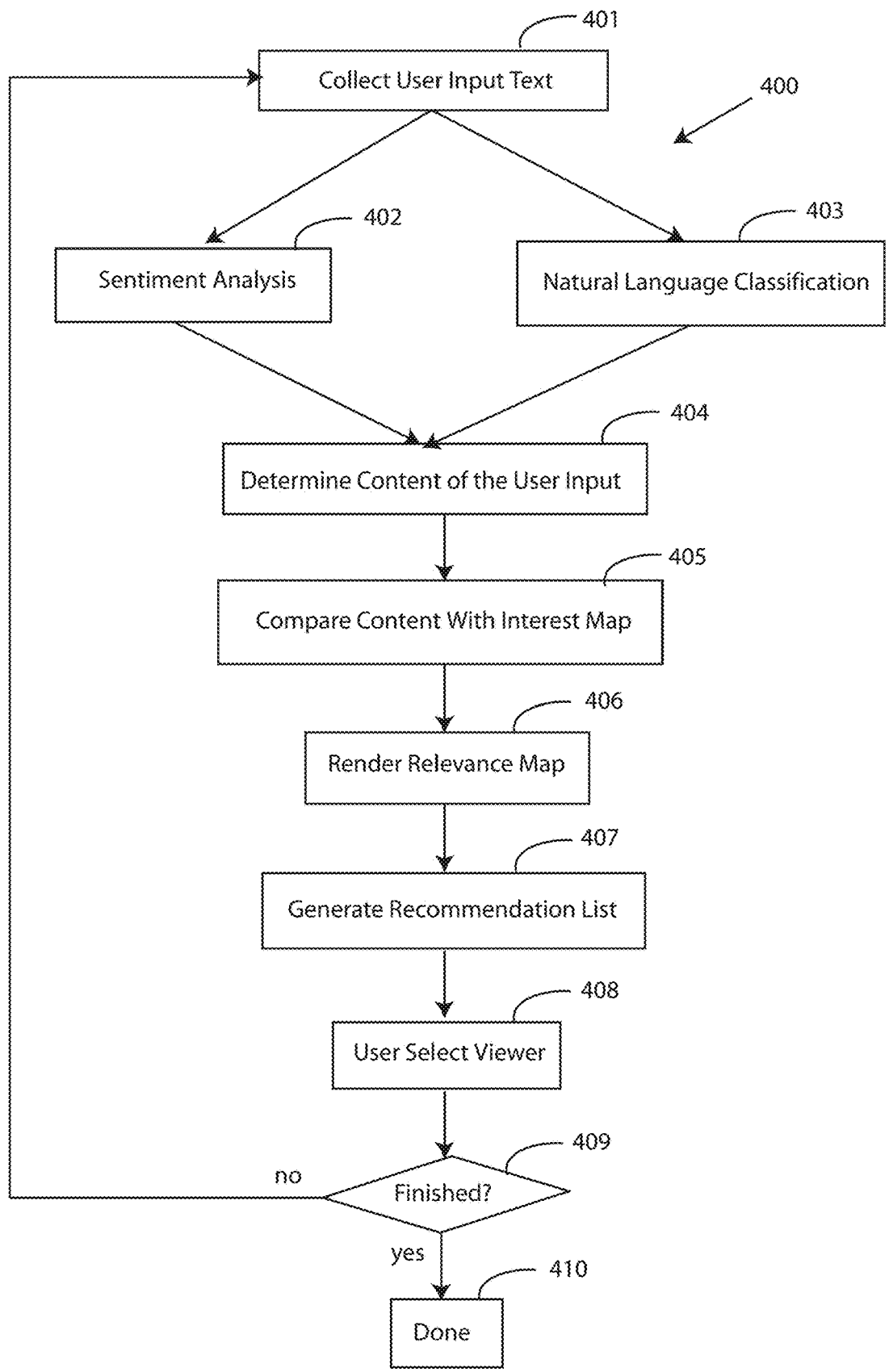
FIG. 6 depicts a detailed flow chart of the method of FIG. 5, in accordance with embodiments of the present invention.

FIG. 6 depicts a detailed flow chart of the method of FIG. 5, in accordance with embodiments of the present invention. Method for 400 may begin at step 401, which collects user input text, or other digital content, such as a photograph. Step 402 performs a sentiment analysis on the collected input, and step 403 performs a natural language classification on the collected input. Based on steps 402 and 403, step 404 determines the content of the user input. Step 406 renders a relevance map that visually depicts a relevance of potential recipients to the user/message creator. Step 407 generates a recommendation list, based on the relevance map, and potentially further filters. In step 408, the user selects the recipients from the recommended recipient list. Alternatively, step 408 may involve automatically populating the recipients into the messaging window for receiving the message, and may add or subtract recipients as the user further adds input. Step 409 determines whether additional input is being received or collected. If yes, then the method 400 continues to operate so that the system provides current, real-time recommendations. If no, then at step 410 then method is completed, and the message may be sent to the recipients selected by the user or automatically added by the application 130.

Figure 7:
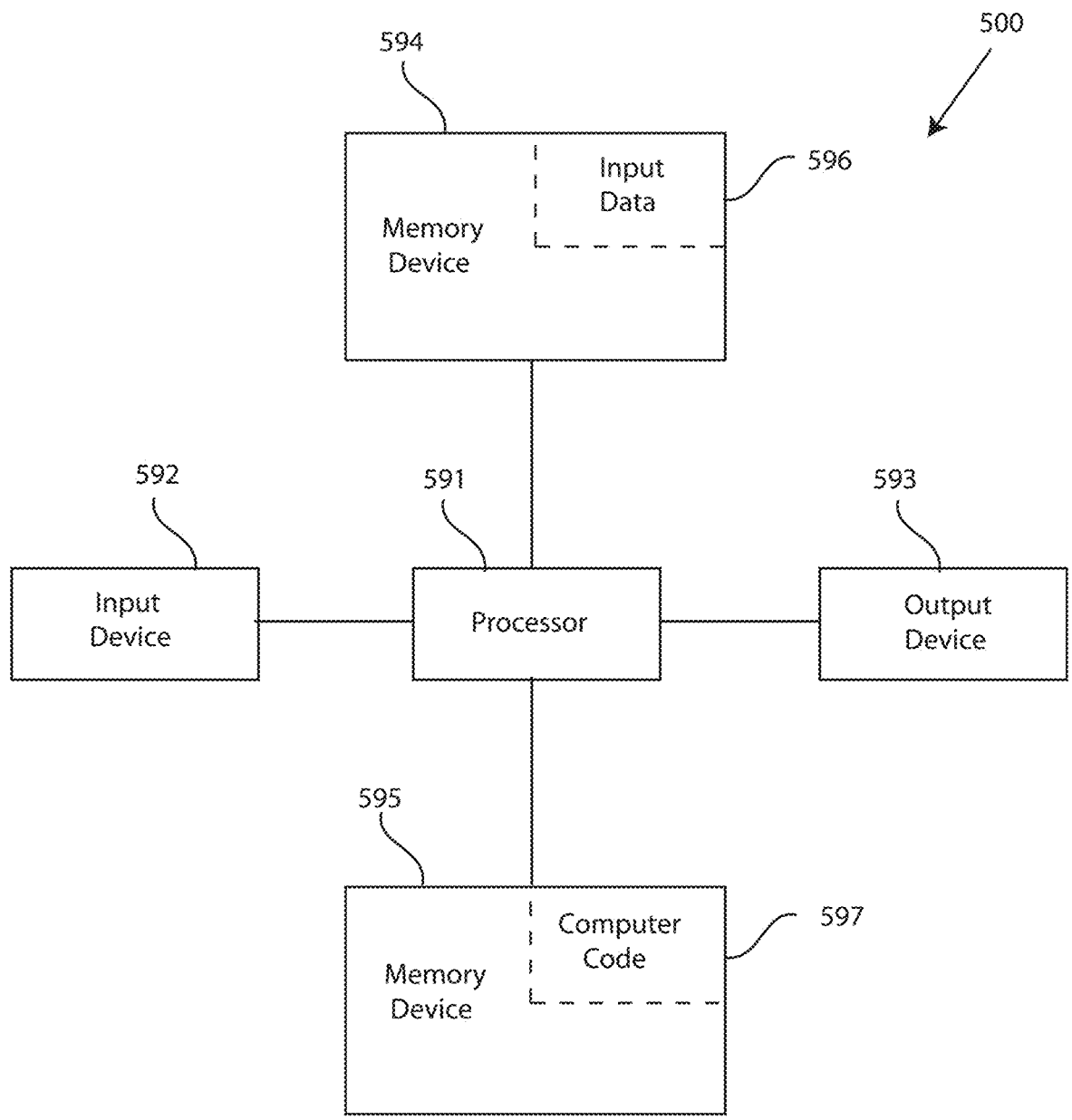
FIG. 7 depicts a block diagram of a computer system for the recipient recommendation system of FIGS. 1-4, capable of implementing methods for real-time recommendation of message recipients based on recipient interests to the content of the message of FIGS. 5-6, in accordance with embodiments of the present invention.

FIG. 7 depicts a block diagram of a computer system for the recipient recommendation system of FIGS. 1-4, capable of implementing methods for real-time recommendation of message recipients based on recipient interests to the content of the message of FIGS. 5-6, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for real-time recommendation of message recipients based on recipient interests to the content of the message in the manner prescribed by embodiments of FIGS. 5-6 using the recipient recommendation system 100 of FIGS. 1-4, wherein the instructions of the computer code 597 may be executed by processor 591 via memory device 595. The computer code 597 may include software or program instructions that may implement one or more algorithms for implementing the method for real-time recommendation of message recipients based on recipient interests to the content of the message, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 7.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to recipient recommendation systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processors) 591, wherein the processor(s) carry out instructions contained in the computer code 597 causing the computer system to determine recommended recipients based on recipient interests to the content of the message, in real-time. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a for real-time recommendation of message recipients based on recipient interests to the content of the message. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for real-time recommendation of message recipients based on recipient interests to the content of the message.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resource (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser web-based e-mail). The consumer does not manage or control the underlying cloud infrastructure including network, servers, operating systems, storage, or even individual application capabilities, with the possible exception of limited user-specific application configuration settings.

Platform Service (PaaS): the capability provided to the consumer is to onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
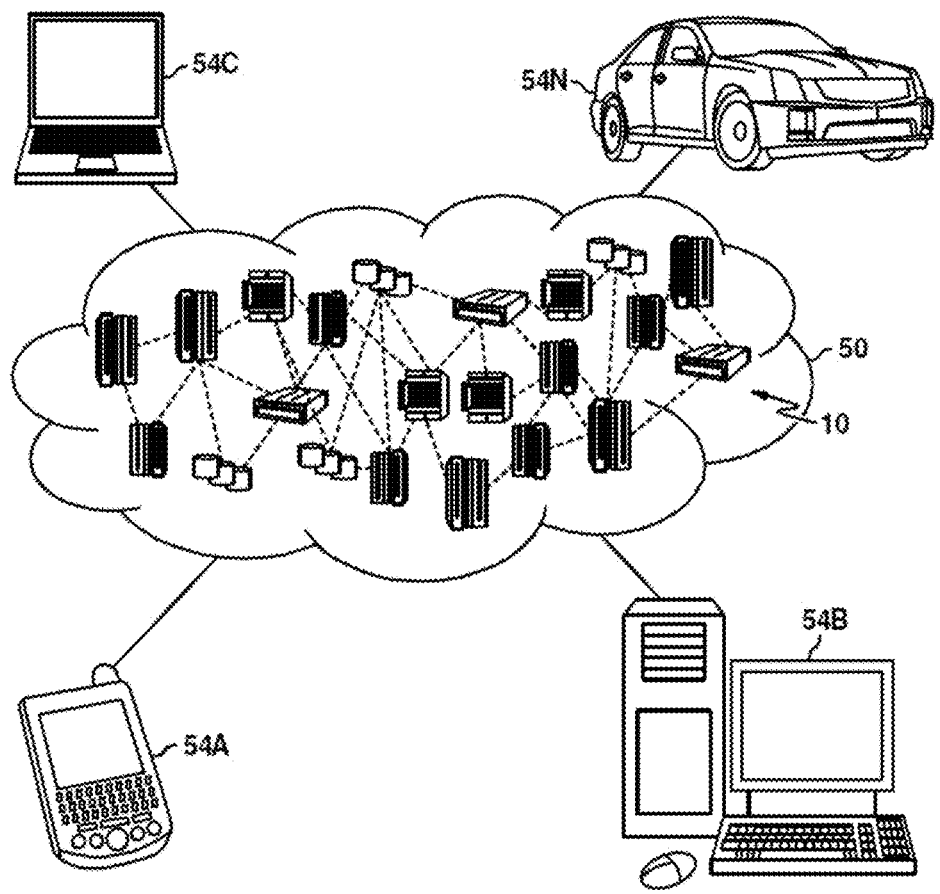
FIG. 8 depicts a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 9:
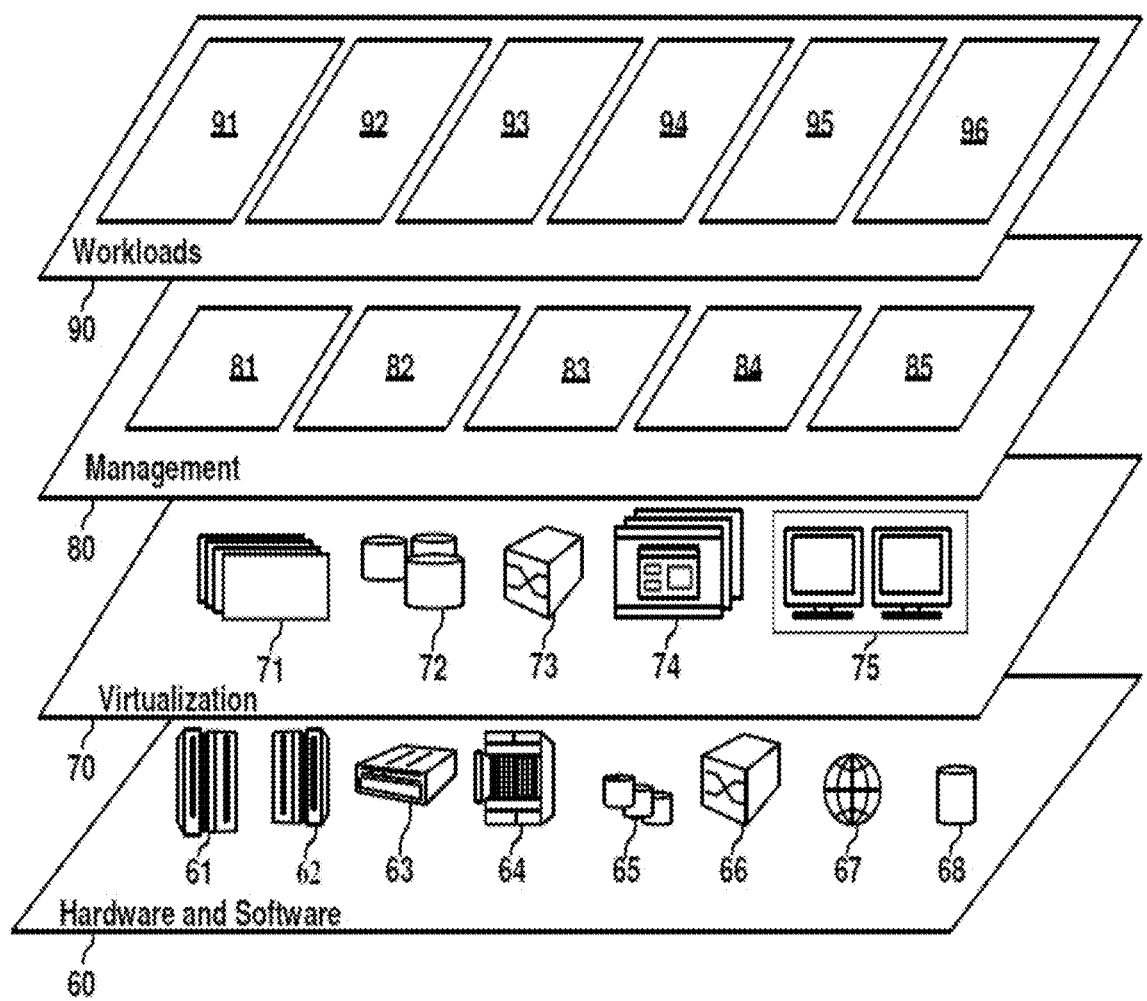
FIG. 9 depicts abstraction model layers, in accordance with embodiments of the present invention.

Referring now to FIG. 9, a set of functional abstraction layers provided by cloud computing environment 50 (see FIG. 8) are shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and recipient recommendation 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method for real-time recommendation of message recipients, the method comprising:
   receiving, by a processor of a computing system, an input from a message creator using a messaging platform;
   continuously analyzing, by the processor, the input for a plurality of dynamic characteristics, as the input is received from the message creator via the messaging platform, the plurality of dynamic characteristics being used to determine a content of the input;

comparing, by the processor, the content with an interest map that aggregates interests of a plurality of potential recipients from of a plurality of interest matrices, wherein the interests of the plurality of potential recipients are acquired by constantly monitoring a message platform activity of the plurality of potential recipients;

determining, by the processor, as a function of the comparing, a relevance ranking of the plurality of potential recipients with respect to the content input by the message creator;

filtering, by the processor, the plurality of potential recipients based on a geographical proximity threshold to a user device of the message creator to reduce a number of the plurality of potential recipients by eliminating recipients that are irrelevant; and visually depicting, by the processor, a relevance graphic proximate a message window of the messaging platform that displays a list of recommended recipients from the plurality of recipients, based on the relevance ranking and the filtering;

wherein the visual graphic is a weighted edge map, wherein an edge of the weighted edge map corresponding to a potential recipient is proportionate to the relevance ranking calculated for the potential recipient ranking.

2. The method of claim 1, wherein continuously analyzing the input for the plurality of dynamic characteristics includes: using, by the processor, a natural language classification and a sentiment analysis technique to determine one or more key entities of the input, a sentiment of the input, and an intention of the input.

3. The method of claim 1, wherein the content of the input is selected from the group consisting of: an emotional reaction to a topic, a comment about the topic, a question about the topic, an intention to take action related to the topic, an action taken on the topic, a perspective on the topic, an information request on the topic, a feeling on the topic, an advertisement related to the topic, a marketing strategy on the topic, a poll related to the topic, a feedback request about the topic, an offer related to the topic, a promotion of the topic, and a combination thereof.

4. The method of claim 3, wherein the topic is selected from the group consisting of: a good, a subject, a geographic location, a service, a service provider, a retailer, an object, a team, a sport, an individual, a county, a political figure, a political issue, an item for sale, a movie, a television show, and a computer technology.

5. The method of claim 1, wherein recipients are available to be selected from the list of recommended recipients so that a target audience receives a message from the message creator.

6. A computer system, comprising:
a processor;
a memory device coupled to the processor; and
a computer readable storage device coupled to the processor, wherein the storage device contains program code executable by the processor via the memory device to implement a method for real-time recommendation of message recipients based on recipient interests to the content of the message, the method comprising:
  receiving, by a processor of a computing system, an input from a message creator using a messaging platform;
  continuously analyzing; by the processor, the input for a plurality of dynamic characteristics, as the input is received from the message creator via the messaging platform, the plurality of dynamic characteristics being used to determine a content of the input;
  comparing, by the processor, the content with an interest map that aggregates interests of a plurality of potential recipients from of a plurality of interest matrices, wherein the interests of the plurality of potential recipients are acquired by constantly monitoring a message platform activity of the plurality of potential recipients;
  determining, by the processor, as a function of the comparing, a relevance ranking of the plurality of potential recipients with respect to the content input by the message creator;
  filtering, by the processor, the plurality of potential recipients based on a geographical proximity threshold to a user device of the message creator to reduce a number of the plurality of potential recipients by eliminating recipients that are irrelevant; and
  visually depicting, by the processor, a relevance graphic proximate a message window of the messaging platform that displays a list of recommended recipients from the plurality of recipients, based on the relevance ranking and the filtering;
  wherein the visual graphic is a weighted edge map, wherein an edge of the weighted edge map corresponding to a potential recipient is, proportionate to the relevance ranking calculated for the potential recipient ranking.

7. The computer system of claim 6, wherein continuously analyzing the input for the plurality of dynamic characteristics includes: using, by the processor, a natural language classification and a sentiment analysis technique to determine one or more key entities of the input, a sentiment of the input, and an intention of the input.

8. The computer system of claim 6, wherein the content of the input is selected from the group consisting of: an emotional reaction to a topic, a comment about the topic, a question about the topic, an intention to take action related to the topic, an action taken on the topic, a perspective on the topic, an information request on the topic, a feeling on the topic, an advertisement related to the topic, a marketing strategy on the topic, a poll related to the topic, a feedback request about the topic, an offer related to the topic, a promotion of the topic, and a combination thereof.

9. The computer system of claim 8, wherein the topic is selected from the group consisting of: a good, a subject, a geographic location, a service, a service provider, a retailer, an object, a team, a sport, an individual, a county, a political figure, a political issue, an item for sale, a movie, a television show, and a computer technology.

10. The computer system of claim 6, wherein recipients are available to be selected from the list of recommended recipients so that a target audience receives a message from the message creator.

11. A computer program product, comprising a computer readable hardware storage device storing a computer readable program code, the computer readable program code comprising an algorithm that when executed by a computer processor of a computing system implements a method for real-time recommendation of message recipients based on recipient interests to the content of the message, the method comprising:
  receiving, by a processor of a computing system, an input from a message creator using a messaging platform;
  continuously analyzing, by the processor, the input for a plurality of dynamic characteristics, as the input is received from the message creator via the messaging platform, the plurality of dynamic characteristics being used to determine a content of the input;

comparing, by the processor, the content with an interest map that aggregates interests of a plurality of potential recipients from of a plurality of interest matrices, wherein the interests of the plurality of potential recipients are acquired by constantly monitoring a message platform activity of the plurality of potential recipients;

determining, by the processor, as a function of the comparing, a relevance ranking of the plurality of potential recipients with respect to the content input by the message creator;

filtering, by the processor, the plurality of potential recipients based on a geographical proximity threshold to a user device of the message creator to reduce a number of the plurality of potential recipients by eliminating recipients that are irrelevant; and visually depicting, by the processor, a relevance graphic proximate a message window of the messaging platform that displays a list of recommended recipients from the plurality of recipients, based on the relevance ranking and the filtering;

wherein the visual graphic is a weighted edge map, wherein an edge of the weighted edge map corresponding to a potential recipient is proportionate to the relevance ranking calculated for the potential recipient ranking.

12. The computer program product of claim 11, wherein continuously analyzing the input for the plurality of dynamic characteristics includes: using, by the processor, a natural language classification and a sentiment analysis technique to determine one or more key entities of the input, a sentiment of the input, and an intention of the input.

13. The computer program product of claim 11, wherein the content of the input is selected from the group consisting of: an emotional reaction to a topic, a comment about the topic, a question about the topic, an intention to take action related to the topic, an action taken on the topic, a perspective on the topic, an information request on the topic, a feeling on the topic, an advertisement related to the topic, a marketing strategy on the topic, a poll related to the topic, a feedback request about the topic, an offer related to the topic, a promotion of the topic, and a combination thereof.

14. The computer program product of claim 13, wherein the topic is selected from the group consisting of: a good, a subject, a geographic location, a service, a service provider, a retailer, an object, a team, a sport, an individual, a county, a political figure, a political issue, an item for sale, a movie, a television show, and a computer technology.

* * * * *